(12) United States Patent
Chen et al.

(10) Patent No.: US 11,746,440 B2
(45) Date of Patent: Sep. 5, 2023

(54) SYSTEM AND METHOD FOR ELECTROSPINNING SUPERFINE FIBER BUNDLING

(71) Applicant: Qingdao University of Science & Technology, Qingdao (CN)

(72) Inventors: Hongbo Chen, Qingdao (CN); Wenwen Han, Qingdao (CN); Hui Liang, Qingdao (CN); Chuansheng Wang, Qingdao (CN); Weimin Yang, Qingdao (CN)

(73) Assignee: Qingdao University of Science & Technology, Qingdao (CN)

( * ) Notice: Subject to any disclaimer, the term of this patent is extended or adjusted under 35 U.S.C. 154(b) by 0 days.

(21) Appl. No.: 17/979,062

(22) Filed: Nov. 2, 2022

(65) Prior Publication Data

US 2023/0160107 A1 May 25, 2023

(30) Foreign Application Priority Data

Nov. 24, 2021 (CN) .......................... 202111404419.X

(51) Int. Cl.
*D01D 5/00* (2006.01)

(52) U.S. Cl.
CPC ......... *D01D 5/0076* (2013.01); *D01D 5/0069* (2013.01)

(58) Field of Classification Search
CPC ... D01D 5/0069; D01D 5/0076; D01D 5/0061
See application file for complete search history.

(56) References Cited

U.S. PATENT DOCUMENTS

| | | | | |
|---|---|---|---|---|
| 2008/0241538 A1* | 10/2008 | Lee | ........................... | D01F 6/90 977/788 |
| 2009/0091065 A1* | 4/2009 | Katti | .................... | D01D 5/0092 425/66 |
| 2009/0324950 A1 | 12/2009 | Kim | | |
| 2014/0072700 A1* | 3/2014 | Kim | ........................ | B05D 1/04 264/464 |
| 2017/0130365 A1* | 5/2017 | Gan | ..................... | H10N 10/856 |

(Continued)

FOREIGN PATENT DOCUMENTS

| CN | 101302673 A | 11/2008 |
|---|---|---|
| CN | 102703998 A | 10/2012 |

(Continued)

*Primary Examiner* — Emmanuel S Luk

(57) ABSTRACT

Disclosed is a system and a method for electrospinning superfine fiber bundling, belonging to the technical field of artificial fiber manufacturing, and comprises a spinning nozzle and a bundling disk which are coaxially arranged; the spinning nozzle is arranged at an upper part of the bundling disk; the bundling disk is connected with a motor through a coupling; the motor rotates to drive the bundling disk to rotate; a guide groove is also arranged outside the bundling disk; a center of the bundling disk is provided with a shaft; the insulated outer ring, the central conductive ring, the insulated inner ring and the shaft are fixed by bonding or thermal compounding; inner and outer edges of the central conductive ring are smooth circular arc rounded corners; an inner edge of the insulated outer ring and an outer edge of the insulated inner ring are corresponding smooth rounded corners.

7 Claims, 5 Drawing Sheets

(56) References Cited

U.S. PATENT DOCUMENTS

| | | | | |
|---|---|---|---|---|
| 2018/0073165 | A1* | 3/2018 | Laid | D04H 1/728 |
| 2020/0390944 | A1* | 12/2020 | Williams | A61B 17/80 |
| 2021/0230774 | A1* | 7/2021 | Haff | B05B 5/0536 |

FOREIGN PATENT DOCUMENTS

| | | |
|---|---|---|
| CN | 104963008 A | 10/2015 |
| CN | 106283219 A | 1/2017 |
| CN | 110923828 A | 3/2020 |
| CN | 113308768 A | 8/2021 |

\* cited by examiner

SYSTEM AND METHOD FOR ELECTROSPINNING SUPERFINE FIBER BUNDLING

CROSS-REFERENCE TO RELATED APPLICATIONS

This application claims priority to Chinese Patent Application No. 202111404419.X, filed on Nov. 24, 2021, the contents of which are hereby incorporated by reference.

TECHNICAL FIELD

The application belongs to the technical field of artificial fiber manufacturing, and in particular relates to a system and a method for electrospinning superfine fiber bundling.

BACKGROUND

Electrospinning can stretch polymer solution or melt in high voltage and strong electric field to form superfine fiber. Electrospinning method has the characteristics of simple principle, wide range of applicable materials and small diameter of produced fibers. In recent years, it has been widely concerned and has a prospect of industrial application.

At present, researchers use electrospinning method to prepare superfine fibers, which are mostly collected in a non-woven state. The messy and loose fiber structure makes the strength of fiber products low, which greatly limits its application and development in fabric direction. In the textile field where fibers are widely used, it is required to collect multiple fibers in bundles and twist them to obtain yarns with high tensile strength and easy knitting. Moreover, oriented fibers have a wide application prospect in the fields of tissue engineering scaffolds, sensors, nanowires, etc. Therefore, it is the future development direction to collect fibers prepared by electrospinning in bundles by a more convenient and reliable method.

The prior art 1, an electrospinning device with multi-electric field coupling and strong drafting, authorized announcement number: CN103243397A, discloses the following contents: the device includes a spinning nozzle, electrode plate 1, electrode plate 2, high voltage electrostatic generator 1, high voltage electrostatic generator 2, fiber receiving plate and grounding electrode; the spinning nozzle is connected with the grounding electrode, the electrode plate is installed below the spinning nozzle, the electrode plate is connected with the electrostatic generator, and the fiber receiving plate is located above or below the electrode plate 2. The device adopts an electrode plate with a hole in the middle, and a plurality of electrode plates are arranged under the spinning nozzle to generate a multi-level electric field, so as to realize multi-electric field coupling strong drafting of the fiber, and make the spun fiber thinner. The diameter of the fiber may be regulated to some extent by adjusting the distance between the electrode plates and the applied voltage.

In the prior art 2, an electrospinning device and method for manufacturing micro-nano fiber supports, the application publication number is CN110409007A, wherein the device includes a hopper, a fiber nozzle, and a grounded fiber receiver, and a metal cylindrical fine needle connected with a high-voltage DC (direct current) power supply is axially installed in the nozzle; according to the preparation method, polymer solution is dispersed and driven by high-pressure gas to form micro-nano polymer solution flow, and micro-nano fibers are formed by high-pressure gas; high-voltage electricity ionizes the air and adsorbs it to the micro-nano polymer solution flow, forming electrostatic force with the receiver, which pulls the polymer chain to improve the orientation and crystallization of the chain, and improves the mechanical properties of the fiber through electrostatic force; the processing speed of the application is obviously higher than that of electrospinning, which is equivalent to that of air-jet technology, and the mechanical properties of the obtained fiber are better than those of micro-nano fibers obtained by traditional air-jet.

The prior art 3, an electrospinning superfine fiber twisting device and method, application publication number: CN113308768A, includes an outer sleeve and an intermediate sleeve, the outer sleeve is sleeved on the intermediate sleeve, an annular gap is formed between the outer sleeve and the intermediate sleeve, the outer sleeve is provided with a melt inlet communicated with the annular gap, the bottom end of the outer sleeve is provided with a tapered hole, and the top end of the tapered hole is communicated with the bottom end of the annular gap, and the outer sleeve is wrapped with a melt for heating the annular gap; a cylindrical metal rod is inserted in the middle sleeve, and there is a gap between the metal rod and the middle sleeve. The bottom end of the metal rod is fixedly connected with a frustum located below the tapered hole, the bottom surface with a larger area on the frustum is fixedly connected with the bottom end of the metal rod, and the bottom surface with a smaller area on the frustum is fixedly connected with a tapered guide tip, and the conical surface of the guide tip is smoothly connected with the conical surface of the frustum. The metal rod, the truncated cone, the guide tip and the annular gap are coaxial.

In the above schemes, the methods of collecting fibers prepared by electrospinning method in bundles include using rotating water flow or air flow to drive the fibers to bundle and twist, etc. The above methods have the disadvantages such as poor stability and uniformity, difficulty in controlling, and impossibility for industrialized production.

SUMMARY

In order to overcome the problems existing in related technologies, the disclosed embodiment of the application provides a system for electrospinning superfine fiber bundling and a method. The technical scheme is as follows:

The system for electrospinning superfine fiber bundling includes a spinning nozzle and a bundling disk which are coaxially arranged; the spinning nozzle is arranged at an upper part of the bundling disk; the bundling disk is connected with a motor through a coupling; the motor rotates to drive the bundling disk to rotate; a guide groove is also arranged outside the bundling disk;

a center of the bundling disk is provided with a shaft; an annular insulated inner ring, a central conductive ring and an insulated outer ring are sequentially arranged from inside to outside with the shaft as the center; the insulated outer ring, the central conductive ring, the insulated inner ring and the shaft are fixed by bonding or thermal compounding; inner and outer edges of the central conductive ring are smooth circular arc rounded corners, and a diameter of the circular arc is equal to a thickness of the central conductive ring, which is used to eliminate splicing lines of the upper and lower surfaces and side surfaces of the central conductive ring and avoid tip discharge caused by charge concentration; a width range of the central conductive ring is 5-60 mm; an inner edge of the insulated outer ring and an outer edge of the insulated inner ring are corresponding smooth rounded corners, and upper and lower surfaces of the insulated outer ring, the central conductive ring and the insulated inner ring are arranged flush on a same plane;

a lower end of the bundling disk is provided with a carbon brush body; the carbon brush body is fixed on the carbon brush bracket; a graphite block in the carbon brush body abuts against a bottom of the central conductive ring of the bundling disk under an action of a spring; the graphite block is connected to an external high-voltage electrostatic generator through a wire.

In one embodiment, a distance between the spinning nozzle and the bundling disk is 5 cm-20 cm.

In one embodiment, a curved end of the guide groove is close to an edge of one side of the bundling disk, and there is a gap between the guide groove and the bundling disk, so that the guide groove does not interfere with a rotation of the bundling disk; an end of the guide groove is provided with a receiving roller which rotates to take up silk.

In one embodiment, the insulated outer ring, the insulated inner ring and the shaft are made of insulating materials, and the central conductive ring is made of conductive materials.

In one embodiment, the spring is installed in the carbon brush body; the spring is used to keep an upper surface of the graphite block against a lower surface of the central conductive ring all the time; an outer side of the carbon brush body is provided with a shell; the shell is fixed on a carbon brush base; the shell is used for keeping the graphite block and the spring in an upright state.

In one embodiment, the spinning nozzle is provided with a nozzle flange and a nozzle body; a central cavity of the nozzle flange form a feed inlet; the central cavity of the nozzle flange is communicated with the central cavity of the nozzle body; a nozzle core is arranged in the nozzle body; a bottom of the nozzle body is an inclined plane extending outward, so that a bottom of the spinning nozzle forms an annular tip; the spinning nozzle is grounded to keep the spinning nozzle at zero potential all the time, so as to form a high-voltage electric field with the central conductive ring.

In one embodiment, a plurality of stopper screws are uniformly arranged on an outer circumference of the nozzle core for clamping the nozzle core and keeping an annular gap between the nozzle core and the nozzle body uniform.

In one embodiment, the nozzle flange is coaxially and fixedly connected with the nozzle body; an outer diameter of the nozzle core is smaller than an inner diameter of the nozzle body.

In one embodiment, a width of the annular gap between the nozzle core and the nozzle body is 0.5-2 mm.

Another object of the present application is to provide a method for realizing the system for electrospinning superfine fiber bundling, wherein the electrospinning superfine fiber bundling method includes the following steps:

S1, after spinning liquid enters the spinning nozzle, the spinning liquid flows into the annular gap under a shunting action of an upper tip on the nozzle core and gradually distributes evenly;

S2, the spinning liquid flows and adheres to the annular tip at the bottom of the nozzle body to form an annular liquid thin layer;

S3, a high-voltage electrostatic generator generates 20-70 kV DC (direct current) voltage, and a high-voltage electrostatic field is formed between the central conductive ring and the grounded spinning nozzle after being charged; and S4, turning on driving motors of the bundling disk and the receiving roller to respectively drive the receiving roller and the bundling disk to rotate; a rotation of the receive roller pulls a pre-placed rope to wind on the receiving roller; one end of the rope is fixedly wound on a surface of the receiving roller, and the other end is coiled for 2-5 circles and placed on the surface of the central conductive ring, so that the superfine fiber adhered to the surface of the rope on the bundling disk at the initial stage is drawn and wound on the receiving rod through the guide groove; after the rope winding is finished, the continuous superfine fiber produced subsequently is driven by the preceding superfine fiber to continuously wind on the receiving roller.

Combining all the above technical schemes, the application has the following advantages and positive effects.

The fibers produced by the electrospinning superfine fiber bundling method provided by the application are superfine fibers with small diameter and light weight of a single fiber, so the fiber breakage or the change of the original planned path is easily caused by the interference of airflow during the generation and falling process; water flow will also bring high-voltage electrostatic breakdown and other problems. Therefore, it conveniently adjusts the collection speed by using mechanical devices to collect superfine fibers in bundles, so as to match the fiber occurrence speed, avoid fiber breakage, and make the fiber falling path more stable, which is conducive to bundle collection. Therefore, the electrospinning superfine fiber bundle system may improve the stability and uniformity of electrospinning fiber bundle.

It should be understood that the above general description and the following detailed description are exemplary and explanatory only, and shall not limit the disclosure of the application.

BRIEF DESCRIPTION OF THE DRAWINGS

The drawings herein are incorporated into and constitute a part of the specification, illustrate embodiments consistent with the disclosure, and together with the specification serve to explain the principles of the disclosure.

DETAILED DESCRIPTION OF THE EMBODIMENTS

Figure 1:
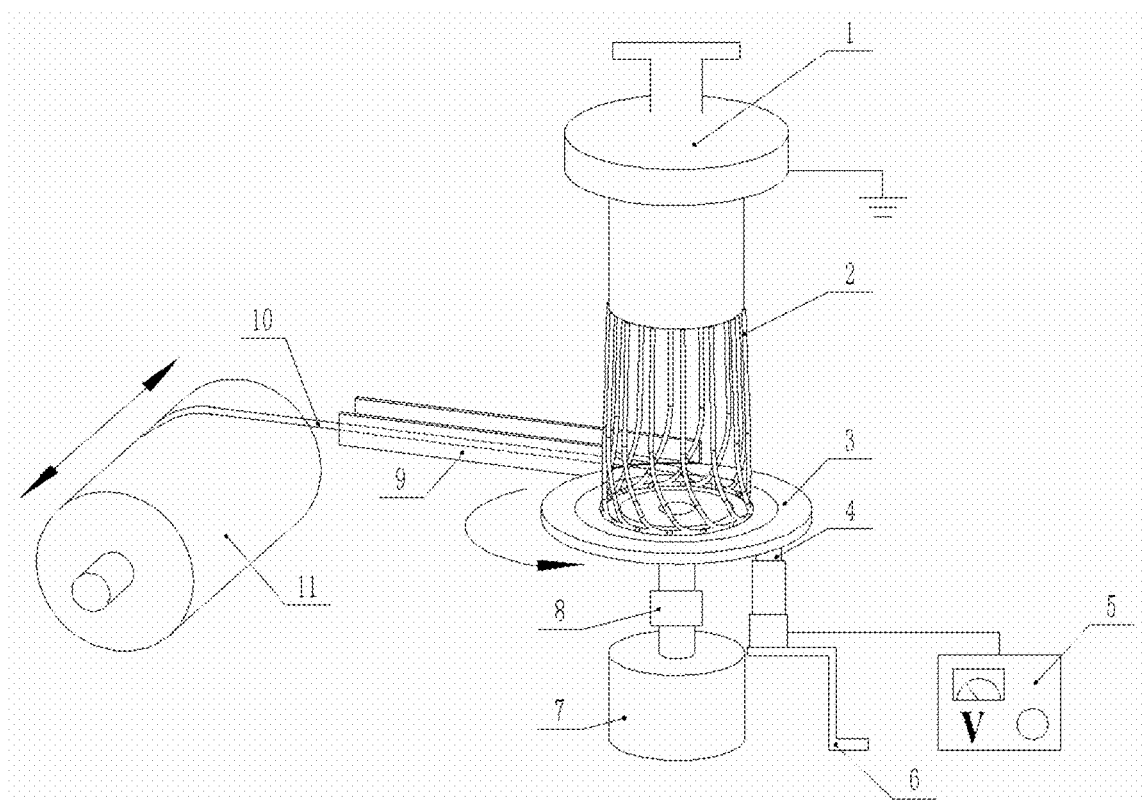
FIG. 1 is a schematic structural diagram of a system for electrospinning superfine fiber bundling provided by an embodiment of the present application.
Figure 2:
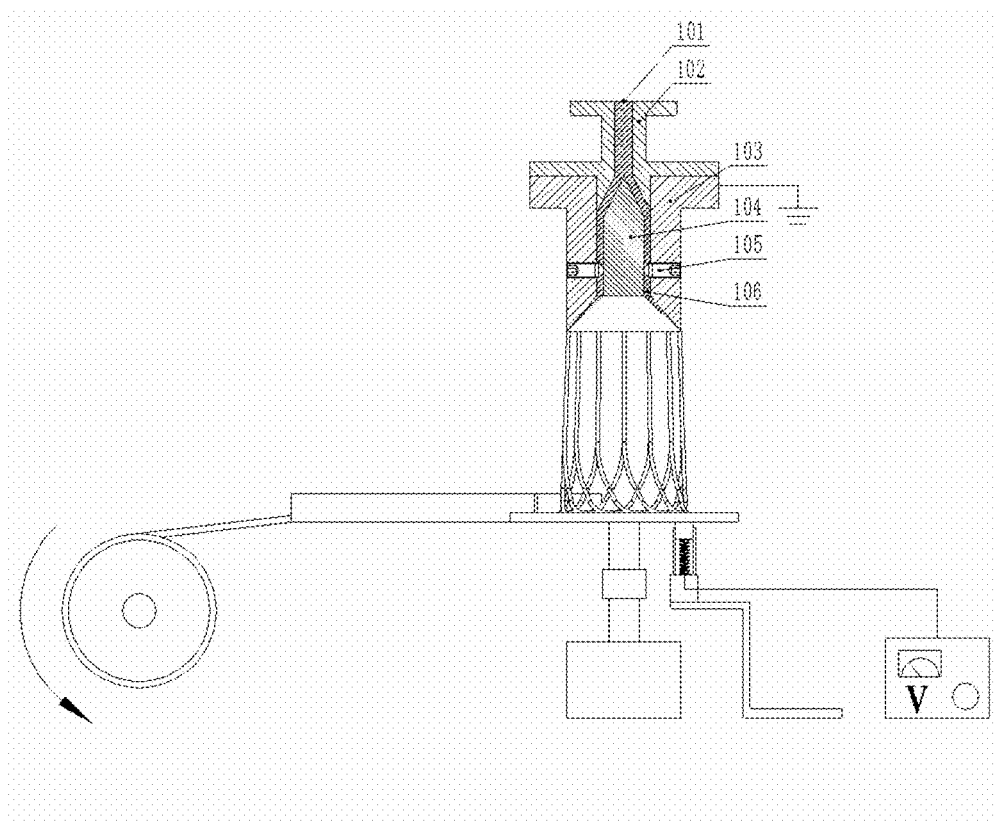
FIG. 2 is a schematic structural diagram of the spinning nozzle provided by the embodiment of the present application.
Figure 3:
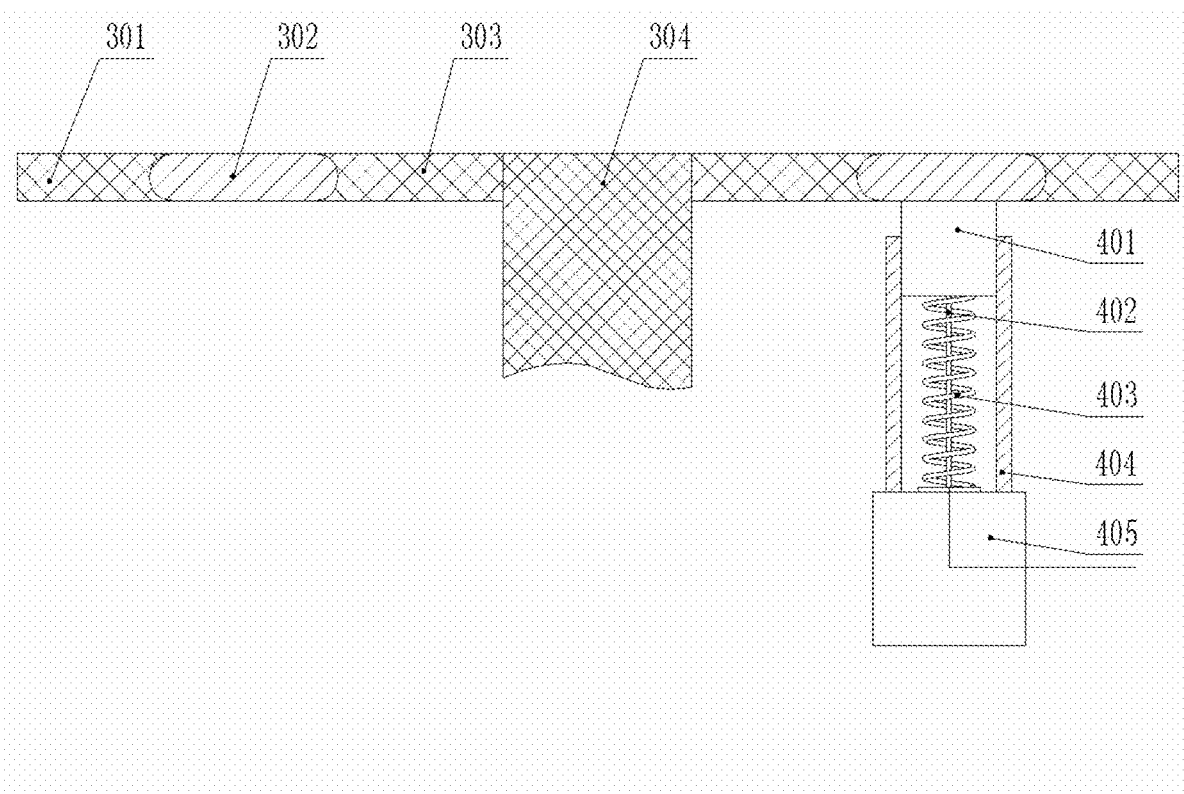
FIG. 3 is a schematic diagram of the matching structure of the bundling disk and the carbon brush provided by the embodiment of the application.
Figure 4:
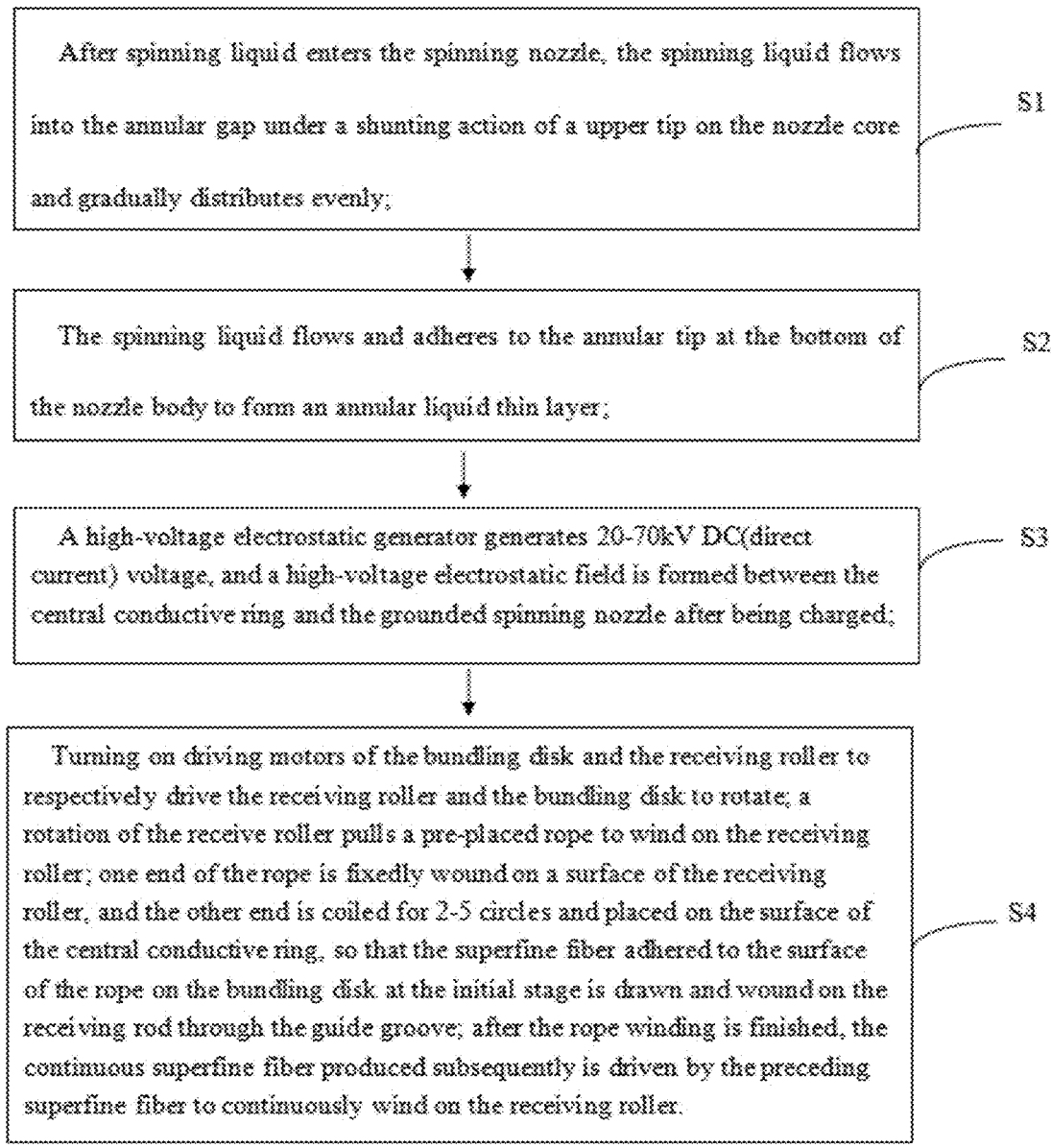
FIG. 4 is a flow chart of the electrospinning superfine fiber bundling method provided by the embodiment of the present application.

In order to make the above objects, features and advantages of the present application more obvious and understandable, the following detailed description of the specific embodiments of the present application will be made with reference to the accompanying drawings. In the following description, numerous specific details are set forth in order to provide a thorough understanding of the present application. However, the application may be implemented in many other ways different from those described here, and those skilled in the art may make similar improvements without violating the connotation of the application, so the application is not limited by the specific implementation disclosed below.

As shown in FIG. 1-FIG. 4, the system for electrospinning superfine fiber bundling is provided with a spinning nozzle 1; the spinning nozzle 1 is arranged at the upper part of the bundling disk 3; the spinning nozzle 1 and the bundling disk 3 are coaxial and keep a distance of 5-20 cm; the bundling disk 3 is connected with the motor 7 through a coupling 8; the motor 7 rotates to drive the bundling disk 3 to rotate; one curved end of the guide groove 9 is close to the edge of one side of the bundling disk 3; the guide groove 9 keeps a certain distance from the bundling disk 3, so that it does not interfere with the rotation of the bundling disk 3; the receiving roller 11 is arranged near the other end of the guide groove 9, and the receiving roller 11 rotates to take up silk.

The carbon brush body 4 is fixed on the carbon brush bracket 6; the graphite block 401 on the carbon body 4 abuts against the bottom of the central conductive ring 302 of the bundling disk 3 under the action of the spring 403; the high-voltage generator 5 is connected with the wire 402 inside the carbon brush body 4; the wire 402 inside the carbon brush body 4 is connected with the graphite block 401.

The bundling disk 3 is composed of four parts, the outermost ring is an insulated outer ring 301, the second is a central conductive ring 302, then is an insulated inner ring 303, and the center is a shaft 304. The insulated outer ring 301, the insulated inner ring 303 and the shaft 304 are made of insulating materials such as polytetrafluoroethylene. The central conductive ring 302 is made of conductive material such as metal; the inner and outer edge of the central conductive ring 302 are smooth circular arc rounded corners; the inner edge of the insulated outer ring 301 and the outer edge of the insulated inner ring 303 are corresponding smooth rounded corners; the outer ring 301, the central conductive ring 302, the insulated inner ring 303 and the shaft 304 are fixed together by bonding or thermal compounding. The spring 403 inside the carbon brush body 4 is used to keep the upper surface of the graphite block 401 against the lower surface of the central conductive ring 302 all the time; the shell 404 is used to keep the graphite block 401 and the spring 403 in an upright state; the wire 402 passes through one end of the spring 403 and is connected with the graphite block 401; the other end of that wire 402 passes through the carbon brush base 405 and is connected with the high-voltage electrostatic generator 5.

The nozzle flange 102 is coaxially and fixedly connected with the nozzle body 103; the central cavity of that nozzle flange 102 forms the feed inlet 101; the central cavity of the nozzle flange 102 is communicated with the central cavity of the nozzle body 103; the nozzle core 104 is arranged inside the nozzle body 103; the outer diameter of the nozzle core 104 is smaller than the inner diameter of the nozzle body 103, and three stopper screws 105 uniformly arranged in the circumferential direction clamp the nozzle core 104, so that the annular gap between the nozzle core 104 and the nozzle body 103 is kept uniform; the width of the annular gap is 0.5-2 mm; the bottom of the nozzle body 103 is an inclined plane extending outward, so that the bottom of the spinning nozzle 1 forms an annular tip, and the spinning nozzle 1 is grounded.

Working principle: spinning liquid such as polymer melt or solution is introduced into the spinning nozzle 1 through the feed inlet 101; after the spinning liquid enters the spinning nozzle 1, the spinning liquid flows into the annular gap under the shunting action of the upper tip on the nozzle core 104 and gradually distributes evenly; the spinning liquid continues to flow downwards and is evenly distributed on the inclined plane extending outward from the bottom of the nozzle body 103; the spinning liquid further flows and adheres to the annular tip at the bottom of the nozzle body 103 to form an annular liquid thin layer 106. The spin nozzle 1 is grounded, and the distance between the bottom tip of the spin nozzle 1 and the upper surface of the bundling disk 3 is adjusted to be 15 cm; a cotton or nylon insulated rope is placed in the guide groove 9 in advance, one end of the rope is wound around the receiving roller 11 for 3-5 times or adhered to the receiving roller 11, so that the rope is fixed on the receiving roller 11, and the other end of the rope is wound on the upper surface of the central conductive ring 302 of the bundling disk 3 for several circles; then turn on the power supply of the high-voltage electrostatic generator 5, and adjust the applied voltage to 70 kV. At this time, the high-voltage electrostatic is conducted to the graphite block 401 by the wire 402 and then to the central conductive ring 302; after being charged, the central conductive ring 302 forms a high-voltage electrostatic field with the grounded spinning nozzle 1, and the spinning liquid annular liquid thin layer 106 at the bottom tip of the spinning nozzle 1 is polarized or induced to be charged and excited to form multiple jets; the multiple jets carry the same charge and repel each other. After a short time, the multiple jets are gradually and evenly distributed to form stable and spaced multiple jets. When the jets fall, the solvent volatilizes or the melt cools to form superfine fiber 2. Because the central conductive ring 302 of the bundling disk 3 is charged with high-voltage static electricity, under the electrostatic adsorption effect, the superfine fiber 2 is adsorbed on the upper surface of the central conductive ring 302, and the initially generated fiber adheres to the rope on the central conductive ring 302; then, the driving motors 7 of the bundling disk 3 and the receiving roller 11 are turned on to drive the receiving roller 11 and the bundling disk 3 to rotate, respectively. The rotation of the receiving roller 11 pulls the rope to wind on the receiving roller 11, and then draws the superfine fiber 2 adhered to the rope surface of the bundling disk 3 at the initial stage to wind on the receiving rod through the guide groove 9.

After the high-voltage static generator 5 is turned on and adjusted to a predetermined voltage value, the high-voltage static electricity is conducted to the central conductive ring 302 through the graphite block 401 to make it charged with high-voltage static electricity; a high-voltage electric field is formed between the central conductive ring 302 and the bottom tip of the spinning nozzle 1; the liquid thin layer distributed annularly at the tip of the bottom of the spinning nozzle 1 is polarized in the high-voltage electric field. After the polarized charge exceeds the threshold, the melt is excited to form multiple jets with uniform distribution, and the multiple jets solidify to form fibers during falling.

Because the fibers produced by the spinning nozzle 1 have continuity, after the superfine fiber 2 is drawn and wound on the receiving roller 11 in the initial stage of the equipment, the superfine fiber 2 produced subsequently will be continuously drawn to the receiving rod for winding and collection under the traction of the front fibers; gradually adjust the rotation speed of the receiving rod and the driving motor 7 of the bundling disk 3, so that the linear speed of the central conductive disk corresponding to the bottom tip of the spinning nozzle 1 and the linear speed of the receiving rod are close to the spinning speed. At this time, a plurality of superfine fibers 2 generated by the bottom tip of the spinning nozzle 1 are electrostatically attracted to the central conductive ring 302 of the bundling disk 3; then, with the rotation of the bundling disk 3, a plurality of superfine fibers 2 gradually converge into one strand, pass through the guide groove 9, and then wind on the receiving roller 11. The bundled fiber bundle 10 may be twisted to form yarns, and then woven into cloth.

Figure 5:
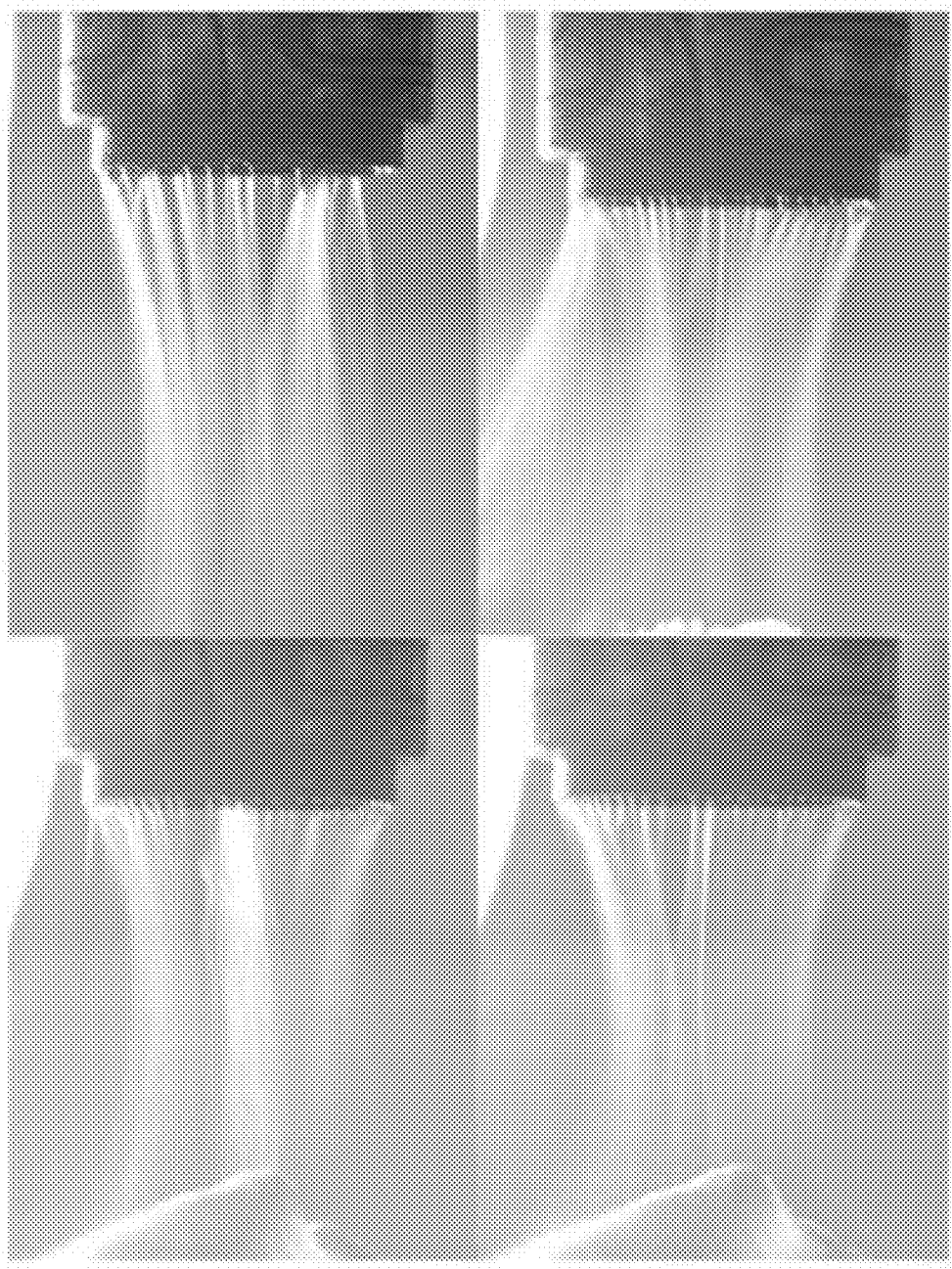
FIG. 5 is an effect diagram of superfine fiber disorder under the action of airflow provided by the embodiment of the present application.

The two sides of the central conductive ring 302 on the bundling disk 3 are designed with smooth rounded corners to avoid the phenomenon of tip discharge, which will cause air breakdown and interrupt the spinning process. The two sides of the central conductive ring 302 are respectively covered by the insulated outer ring 301 and the insulated inner ring 303. In order to prevent the fibers from being attracted to the two sides of the central conductive ring 302, so that the fibers are collected on the upper surface of the central conductive ring 302 and then bundled. FIG. 5 shows the effect of ultrafine fibers being disordered under the action of airflow.

Those skilled in the art may easily implement other embodiments of the present disclosure after considering the specification and practicing the disclosure disclosed herein. This application is intended to cover any variations, uses or adaptations of this disclosure, which follow the general principles of this disclosure and include common knowledge or common technical means in this technical field that are not disclosed in this disclosure. The specification and examples are to be regarded as examples only, and the true scope and spirit of the present disclosure are defined by the appended claims.

It should be understood that the present disclosure is not limited to the precise structure described above and shown in the drawings, and various modifications and changes may be made without departing from its scope. The scope of this disclosure should be limited by the appended claims.

What is claimed is:

1. A system for electrospinning superfine fiber bundling, comprising a spinning nozzle and a bundling disk in a coaxial arrangement, wherein the spinning nozzle is arranged at an upper part of the bundling disk; the bundling disk is connected with a motor through a coupling; the motor rotates to drive the bundling disk to rotate; and a guide groove is also arranged outside the bundling disk;

a center of the bundling disk is provided with a shaft; an annular insulated inner ring, a central conductive ring and an insulated outer ring are sequentially arranged from inside to outside with the shaft as a center; the insulated outer ring, the central conductive ring, the insulated inner ring and the shaft are fixed by bonding or thermal compounding; inner and outer edges of the central conductive ring are smooth circular arc with rounded corners, and a diameter of the circular arc is equal to a thickness of the central conductive ring to eliminate splicing lines of upper and lower surfaces and side surfaces of the central conductive ring and avoid tip discharge caused by charge concentration; a width range of the central conductive ring is 5-60 millimeters (mm); an inner edge of the insulated outer ring and an outer edge of the insulated inner ring are corresponding smooth rounded corners, and upper and lower surfaces of the insulated outer ring, the central conductive ring and the insulated inner ring are arranged flush on a same plane; and a lower end of the bundling disk is provided with a carbon brush body; the carbon brush body is fixed on a carbon brush bracket; a graphite block in the carbon brush body abuts against a bottom of the central conductive ring of the bundling disk under an action of a spring;

and the graphite block is connected to a high-voltage electrostatic generator arranged externally through a wire, a distance between the spinning nozzle and the bundling disk is 5 centimeters (cm)-20 cm;

a curved end of the guide groove is close to an edge of one side of the bundling disk, and there is a gap between the guide groove and the bundling disk, so the guide groove does not interfere with a rotation of the bundling disk, and an end of the guide groove is provided with a receiving roller to rotate to take op silk;

the insulated outer ring, the insulated inner ring and the shaft are made of insulating materials, and the central conductive ring is made of conductive materials.

2. The system for electrospinning superfine fiber bundling according to claim 1, wherein the spring is installed in the carbon brush body; the spring is used to keep an upper surface of the graphite block against a lower surface of the central conductive ring all the time; an outer side of the carbon brush body is provided with a shell; the shell is fixed on a carbon brush base; and the shell is used for keeping the graphite block and the spring in an upright state.

3. The system for electrospinning superfine fiber bundling according to claim 1, wherein the spinning nozzle is provided with a nozzle flange and a nozzle body; a central cavity of the nozzle flange forms a feed inlet; the central cavity of the nozzle flange is communicated with a central cavity of the nozzle body; a nozzle core is arranged in the nozzle body; a bottom of the nozzle body is an inclined plane extending outward, so a bottom of the spinning nozzle forms an annular tip; and the spinning nozzle is grounded to keep the spinning nozzle at zero potential constantly, so as to form a high-voltage electric field with the central conductive ring.

4. The system for electrospinning superfine fiber bundling according to claim 3, wherein a plurality of stopper screws are uniformly arranged on an outer circumference of the nozzle core for clamping the nozzle core and keeping an annular gap between the nozzle core and the nozzle body uniform.

5. The system for electrospinning superfine fiber bundling according to claim 3, wherein the nozzle flange is coaxially and fixedly connected with the nozzle body; and an outer diameter of the nozzle core is smaller than an inner diameter of the nozzle body.

6. The system for electrospinning superfine fiber bundling according to claim 3, wherein a width of the annular gap between the nozzle core and the nozzle body is 0.5-2 mm.

7. A method for realizing the system for electrospinning superfine fiber bundling according to claim 1, wherein the method comprises following steps:

step1, spinning liquid flowing into the annular gap under a shunting action of an upper tip on the nozzle core and gradually distributing evenly after entering the spinning nozzle;

step2, the spinning liquid flowing and adhering to the annular tip at the bottom of the nozzle body to form an annular liquid thin layer;

step3, the high-voltage electrostatic generator generating 20-70 kV DC (direct current) voltage, and a high-voltage electrostatic field being formed between the central conductive ring after being charged and a grounded spinning nozzle; and step4, turning on the motor for driving the bundling disk and the receiving roller to respectively drive the receiving roller and the bundling disk to rotate; a rotation of the receiving roller pulling a pre-placed rope to wind on the receiving roller; one end of the rope being fixedly wound on a surface of the receiving roller, and an other end of the rope being coiled for 2-5 circles and placed on a surface of the central conductive ring, so a superfine fiber adhered to a surface of the rope on the bundling disk at an initial stage being drawn and wound on the receiving roller through the guide groove; and a continuous superfine fiber produced subsequently being driven by a preceding superfine fiber to continuously wind on the receiving roller after a winding of the rope winding is finished.

* * * * *